United States Patent [19]
Hall

[11] 3,806,803

[45] Apr. 23, 1974

[54] PORTABLE VOLTAGE SAMPLING PROBE DEVICE

[75] Inventor: George A. Hall, Culver City, Calif.

[73] Assignee: General Telephone Company of California, Santa Monica, Calif.

[22] Filed: June 6, 1973

[21] Appl. No.: 367,391

[52] U.S. Cl. .............................. 324/133, 324/72.5

[51] Int. Cl. ...................... G01r 19/14, G01r 19/16

[58] Field of Search .................... 324/72.5, 51, 133; 307/236; 328/118; 340/248 A, 248 B, 248 C

[56] References Cited

UNITED STATES PATENTS

| | | | |
|---|---|---|---|
| 3,600,678 | 8/1971 | Garrett et al. | 324/133 |
| 2,993,172 | 7/1961 | Karlicek | 324/133 |
| 3,510,771 | 5/1970 | Embree et al. | 340/248 C |
| 3,025,414 | 3/1962 | McVey | 328/118 X |
| 3,617,879 | 11/1971 | Mugnier | 340/248 A X |

OTHER PUBLICATIONS

Frankeny, R. F. Drift Indicator IBM Technical Disclosure Bulletin Vol. 14 No. 3 Aug. 1971 p. 724.

*Primary Examiner*—Gerard R. Strecker
*Attorney, Agent, or Firm*—Pastoriza & Kelly

[57] ABSTRACT

A portable solid state probe device is used to sample the voltage for polarity at various points in either telephone central office equipment or outside key equipment. The device itself includes first and second light emitting diodes which will respectively become energized when the sampled voltage is of positive or negative polarity. The device includes Zener regulating diodes to provide a substantially constant voltage to the light emitting diodes so that the device will function properly when supplied with either 48 volts as is available in central office equipment or 24 volts as is only available in field key equipment.

2 Claims, 2 Drawing Figures

PATENTED APR 23 1974 3,806,803

PORTABLE VOLTAGE SAMPLING PROBE DEVICE

This invention relates generally to electrical instruments and more particularly to a portable solid state voltage sampling device to provide an indication of polarity particularly designed for use with telephone equipment.

BACKGROUND OF THE INVENTION

Test lamp devices for determining polarity at various points in circuits are known in the art. In the case of telephone equipment, polarity test probes which are not of the solid state type draw so much current as to destroy many of the newer electronic devices employed in the telephone circuits.

Solid state test probes have been developed one example thereof being fully disclosed in U.S. Pat. No. 3,600,678. This device is satisfactory if its use is restricted to central office equipment since it requires 48 volts to operate and this voltage is always available in central offices. However, the device is useless in field work where there is only 24 volts available such as in key equipment. Moreover, such solid state devices in general that have been developed to date are relatively expensive to manufacture and in view of their use of filament or neon type test lamps, they lack in many instances the degree of ruggedness for extended use in telephone field work.

BRIEF DESCRIPTION OF THE PRESENT INVENTION

With the foregoing in mind, the present invention comprises an improved voltage sampling probe device particularly suited to telephone work which may readily be utilized with either a 48 volt or 24 volt supply so as to be far more versatile than presently available devices. Thus the same voltage sampling probe device can be used in testing central office equipment or in testing key equipment out in the field. In addition, the entire circuitry is solid state, the test lamps themselves taking the form of light emitting diodes to provide a more rugged and less expensive device than has been heretofore available.

Briefly, the device includes positive and negative terminals for connection to a voltage supply from either central office telephone equipment or key equipment in the field. Also included are first and second Zener diodes connected in series with each other across the ends of first and second voltage dropping resistances in turn connecting to the positive and negative terminals. First and second light emitting diodes and first and second switching transistors respectively form first and second series circuits connected across the first and second Zener diodes respectively. The switching transistors have their base terminals connected to the test probe so that a first transistor is turned on and the second turned off when a positive polarity voltage is applied to the probe. Circuits are thus completed through the first and second light emitting diodes respectively depending upon the sampled polarity, light from the first light emitting diode and no light from the second indicating a positive voltage and no light from the first light emitting diode and light from the second indicating a negative voltage.

An important and distinguishing feature from prior art devices is the provision of the first and second Zener diodes which have a given threshold voltage such that the voltage across each light emitting diode when energized is regulated to a given value which is substantially constant so long as the voltage from the supply source is at least equal to twice the threshold voltage. In the preferred embodiment, the threshold voltage is 12 volts for each Zener diode so that proper voltage regulation will be effected whether 24 volts or 48 volts are supplied to the device.

A further feature of the circuit design is the fact that no wasted current drain occurs when a light emitting diode is not operating. In other words, instead of short circuiting the non-active light as has been done heretofore, the light is simply removed from the circuit when its series connected transistor is in an off condition.

BRIEF DESCRIPTION OF THE DRAWINGS

A better understanding of the improved voltage sampling probe device of this invention will be had by now referring to the accompanying drawings in which.

DETAILED DESCRIPTION OF THE PREFERRED EMBODIMENT

Figure 1:
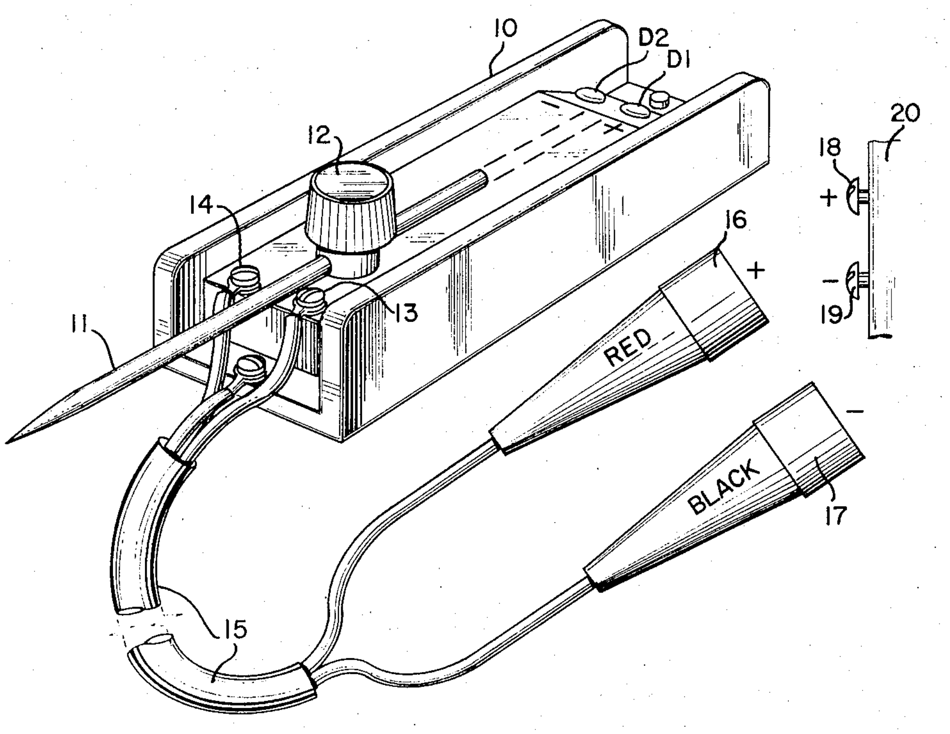
FIG. 1 is a perspective view of the portable probe device preparatory to being connected to a source of voltage from available telephone equipment; and, FIG. 2 is a schematic circuit diagram of the various components making up the circuit in the device of FIG. 1.

Referring first to FIG. 1, the voltage sampling test probe includes a casing structure 10 of electrical insulating material supporting an extendable conductive probe 11. The probe 11 may be secured by a binding post 12 in such a manner that it may be retracted when not in use. Exposed on the surface of the device are a first positive terminal 13 and a second negative terminal 14 for connection by means of a cable 15 and suitable clips 16 and 17 to the positive and negative terminals 18 and 19 available in telephone equipment 20 to provide a d.c. source of given voltage.

The device is also provided with means for viewing first and second light emitting diodes designated D1 and D2 and marked as positive and negative respectively. The arrangement is such that when proper voltage is supplied to the terminals 13 and 14 through the cable 15, application of the test probe 11 to a point in a circuit will cause light to be emitted by one or the other of the light emitting diodes D1 or D2 depending upon whether the polarity of the sampled voltage is positive or negative.

Figure 2:
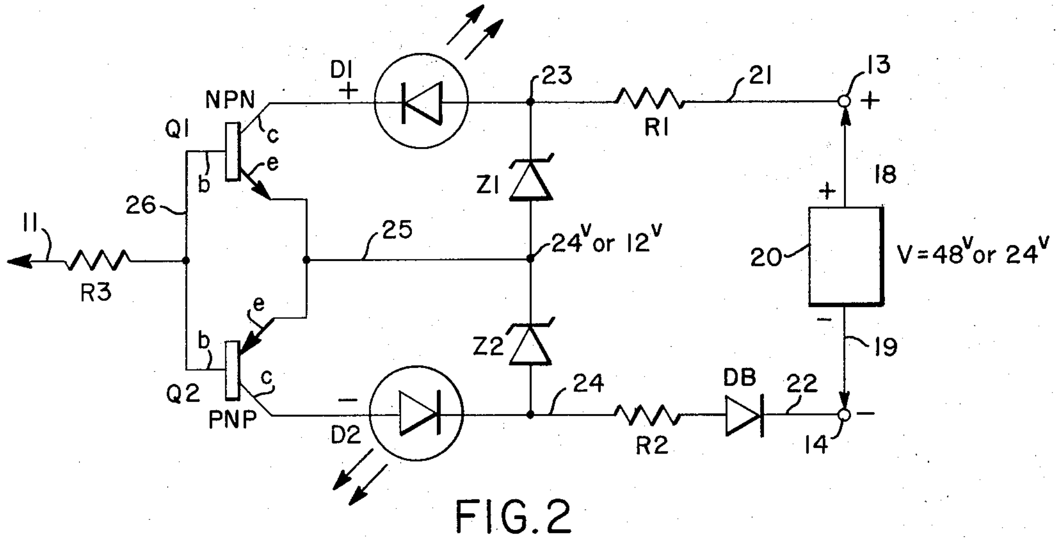

The manner in which the foregoing is accomplished will become clear by referring to the circuit of FIG. 2. In FIG. 2, portions corresponding to those described in FIG. 1 are indicated by the same numerals.

Essentially, the circuit includes first and second voltage dropping resistances R1 and R2 having first ends 21 and 22 connected respectively to the first and second positive and negative terminals 13 and 14. First and second Zener diodes Z1 and Z2 are connected in series with each other across the second ends 23 and 24 of the resistances.

The light emitting diodes D1 and D2 are connected respectively in series with first and second switching transistors Q1 and Q2 to form first and second series circuits. These first and second series circuits in turn connect respectively across the Zener diodes Z1 and Z2 by means of common lead 25. The base terminals of the transistors designated *b* are connected together by lead 26, this lead in turn connecting through resistance R3 to the probe 11.

In the specific embodiment disclosed, the transistor Q1 constitutes an NPN transistor having its collector terminal *c* connected to the cathode terminal of the light emitting diode D1 and its emitter terminal *e* connected to the common lead 25 at the junction point between the Zener diode Z1 and Z2, and the second transistor Q2 is a PNP with its emitter terminal *e* connected to the common lead 25 and its collector terminal *c* connecting to the anode of the second light emitting diode D2. Further, in the preferred embodiment there is provided a diode D3 connected in series between the second resistance R2 and second negative terminal 14 which functions to render the device inoperable if the first and second terminals are inadvertently reversed and connected to the negative and positive terminals 19 and 18 of the source 20 respectively. The first and second resistances R1 and R2 each have a value of 560 ohms and the resistance R3 has a value of 33 thousand ohms.

OPERATION

In operation, assume that the probe is first used in a central office wherein the supply voltage is 48 volts applied to the first and second terminals 13 and 14. Prior to sampling any particular point in a circuit with the probe 11, there will result a 12 volt drop across each of the resistances R1 and R2 and each Zener diode Z1 and Z2 has a threshold of voltage of 12 volts so that at all times the voltage on the common lead 25 will be 24 volts.

If now the probe 11 is applied to a circuit point having a positive polarity, the positive voltage applied to the base terminals of each of the transistors Q1 and Q2 will turn transistor Q1 on and assure that transistor Q2 remains off. When transistor Q1 is turned on, a circuit is completed from the positive terminal 13 of the source through the first resistance R1 and light emitting diode D1, transistor Q1, common lead 25, second Zener diode Z2, second resistance R2 and diode D3 to the negative terminal of the source thereby causing light to be emitted from the light emitting diode D1. As stated, the same positive voltage on the probe 11 holds the second transistor Q2 off so that the second light emitting diode D2 is essentially removed from the circuit.

Light from the first light emitting diode D1 and no light from the second light emitting diode D2 indicates that the voltage at the point to which the probe is applied is of positive polarity.

If the voltage at the point to which the probe is applied is of negative polarity, this negative voltage on the lead 26 will turn off the first transistor Q1 to block any current flow through the first light emitting diode D1 and turn on transistor Q2 to complete a circuit from the positive terminal 13 through the first resistance R1, Zener diode Z1, common lead 25, the second transistor Q2, second light emitting diode D2, second resistance R2 and diode D3 to the negative terminal 14. Light from the second light emitting diode and no light from the first light emitting diode thus indicates that the voltage at the point to which the probe is applied is of negative polarity.

If the probe 11 is applied to a point constituting an a.c. line "hot side" both light emitting diodes will emit light. If the probe contacts the ground side of the a.c. line, the positive light emitting diode only will light.

If the probe contacts a ringing generator, both light emitting diodes will light until a silent period. Thereafter only the second light emitting diode will remain lit.

In the event the probe is used in the field where only 24 volts is available, connection of the terminals to this 24 volt supply will result in a potential of 12 volts on the common lead 25, there taking place equal voltage drops across the resistances and Zener diodes. However, when either one or the other of the light emitting diodes is energized depending upon the particular polarity of the sampled voltage, the Zener diodes will function to regulate the voltage supplied to the light emitting diode to be substantially the same as that supplied when 48 volts was available. Polarity may thus be tested in the same manner described with respect to those situations in which 48 volts is used.

It will be appreciated from the foregoing, that an important feature of this invention resides in the provision of the Zener diodes which have a given threshold voltage such that the voltage across each light emitting diode when energized is regulated to a given value which is substantially constant. It will be understood however that the voltage supplied to the device must be at least equal to twice the threshold voltage of each of the Zener diodes for the particular symmetrical circuit arrangement described.

From the foregoing description, it will be clear that the present invention has provided an improved voltage sampling probe which is not only rugged and long lasting but has the advantage of being able to operate on either 48 or 24 volts so that it is ideally suited for both central office and field telephone work.

What is claimed is:

1. A portable device having a conductive probe for engaging a point to sample the polarity of the voltage at said point, and including a solid state circuit, said circuit comprising, in combination:

a. a first positive terminal and a second negative terminal for connection to the positive and negative terminals of a d-c source of given voltage, respectively;

b. first and second voltage dropping resistances having first and second ends, the first ends connecting to said first and second terminals respectively;

c. first and second Zener diodes connected in series with each other across the second ends of said resistances;

d. first and second light emitting diodes;

e. first and second switching transistors, said first light emitting diode being connected in series with said first switching transistor to define a first series circuit connected across said first Zener diode and said second light emitting diode being connected in series with said second switching transistor to define a second series circuit connected across said second Zener diode, said conductive probe being connected to the base terminals of said transistors, said first transistor turning on to complete a circuit from the positive terminal of said voltage source through said first resistance and first light emitting diode and said second Zener diode and said second resistance to the negative terminal of said voltage source in response to a positive polarity of voltage at said point to which said probe is applied, said second transistor being turned off to block any current flow through said second light emitting diode in response to the positive polarity, and, said first transistor turning off to block any current flow through said first light emitting diode in response to a negative polarity of voltage at said point to which said probe is applied, said second transistor being turned on to complete a circuit from the positive terminal of said voltage source through said first resistance and first Zener diode and said second light emitting diode and second resistance to the negative terminal of said voltage source in response to said negative polarity, whereby light from said first light emitting diode and no light from said second light emitting diode indicates that the voltage at said point is of positive polarity and light from said second light emitting diode and no light from said first light emitting diode indicates that the voltage at said point is of negative polarity, said first and second Zener diodes having a given threshold voltage to thereby regulate the voltage across each light emitting diode when energized to a given value which is substantially constant so long as the given voltage is at least equal to twice the said threshold voltage.

2. A device according to claim 1, including a diode connected in series between said second resistance and second negative terminal whereby said device is rendered inoperative if said first and second terminals are inadvertently connected to the negative and positive terminals of said d-c source of given voltage respectively.

* * * * *